United States Patent
Torsner et al.

(10) Patent No.: US 12,323,250 B2
(45) Date of Patent: *Jun. 3, 2025

(54) METHOD AND A DEVICE FOR IMPROVED STATUS REPORTS

(71) Applicant: TELEFONAKTIEBOLAGET LM ERICSSON (PUBL), Stockholm (SE)

(72) Inventors: Johan Torsner, Kyrkslatt (FI); Michael Meyer, Aachen (DE); Henning Wiemann, Aachen (DE)

(73) Assignee: Telefonaktibolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,421

(22) Filed: Mar. 20, 2023

(65) Prior Publication Data
US 2023/0224085 A1    Jul. 13, 2023

Related U.S. Application Data

(63) Continuation of application No. 16/952,276, filed on Nov. 19, 2020, now Pat. No. 11,611,410, which is a
(Continued)

(51) Int. Cl.
*H04L 1/16* (2023.01)
*H04L 1/1607* (2023.01)
(Continued)

(52) U.S. Cl.
CPC .......... *H04L 1/1671* (2013.01); *H04L 1/1621* (2013.01); *H04L 1/1642* (2013.01);
(Continued)

(58) Field of Classification Search
CPC ... H04L 1/1614; H04L 1/0041; H04L 1/0057; H04L 1/00; H04L 1/0026; H04L 1/1671; H04L 1/1621; H04L 1/1664
See application file for complete search history.

(56) References Cited

U.S. PATENT DOCUMENTS

| 5,477,550 A | 12/1995 | Crisler |
| 5,581,804 A | 12/1996 | Cameron |

(Continued)

FOREIGN PATENT DOCUMENTS

| EP | 0769236 B1 | 9/2004 |
| EP | 1601127 A2 | 11/2005 |

(Continued)

OTHER PUBLICATIONS

3GPP TS 36.322 V2.0.0 (Nov. 2007) 3rd Generation Partnership Project; Technical Specification Group Radio Access Network; Evolved Universal Terrestrial Radio Access (E-UTRA) Radio Link Control (RLC) Protocol Specification (Release 8).
(Continued)

*Primary Examiner* — Sai Aung

(57) ABSTRACT

The invention discloses a method (700) for a cellular system (100), in which traffic can be exchanged between first (110, 120) and second (110, 120) transceivers. The traffic is sent in data units, each of which is given an identifier, and which data units may be divided into segments. A receiving transceiver (110, 120) may send status information in data frames or data units (200, 300) about properly received, partially received, or non-received data units to a sending transceiver, i.e. the transceiver from which the data was sent. In the case (705) of partially or non-received data units, the status information includes (710) information about whether the data unit or units were non-received or partially received, and in the case of one or more partially received data units, which (715) parts of those data units that were not received.

13 Claims, 8 Drawing Sheets

Related U.S. Application Data continuation of application No. 15/650,062, filed on Jul. 14, 2017, now Pat. No. 10,873,419, which is a continuation of application No. 14/614,159, filed on Feb. 4, 2015, now Pat. No. 9,729,278, which is a continuation of application No. 13/269,338, filed on Oct. 7, 2011, now Pat. No. 8,982,870, which is a continuation of application No. 12/524,891, filed as application No. PCT/SE2008/050108 on Jan. 28, 2008, now Pat. No. 8,036,150.

(60) Provisional application No. 60/983,633, filed on Oct. 30, 2007.

(51) Int. Cl.
    *H04L 1/18*      (2023.01)
    *H04L 5/00*      (2006.01)
    *H04L 27/26*      (2006.01)
    *H04W 72/04*      (2023.01)
    *H04W 72/20*      (2023.01)

(52) U.S. Cl.
    CPC ............ *H04L 1/165* (2013.01); *H04L 5/0055* (2013.01); *H04W 72/20* (2023.01)

(56) References Cited

U.S. PATENT DOCUMENTS

| | | | |
|---|---|---|---|
| 5,634,198 | A | 5/1997 | Cameron |
| 5,754,946 | A | 5/1998 | Cameron |
| 6,963,540 | B2 * | 11/2005 | Choi ................... H04W 72/20 370/335 |
| 7,113,496 | B2 * | 9/2006 | Koo ................... H04W 52/58 370/335 |
| 7,684,407 | B2 | 3/2010 | Kuchibhotla |
| 8,036,150 | B2 | 10/2011 | Meyer |
| 8,261,150 | B2 | 9/2012 | Murakami |
| 2002/0146074 | A1 | 10/2002 | Ariel |
| 2003/0195016 | A1 | 10/2003 | Periyalwar |
| 2003/0214930 | A1 * | 11/2003 | Fischer ............... H04L 12/5602 370/352 |
| 2004/0047331 | A1 | 3/2004 | Jang |
| 2005/0050427 | A1 | 3/2005 | Jeong |
| 2005/0165950 | A1 | 7/2005 | Takagi |
| 2005/0251721 | A1 | 11/2005 | Ramesh |
| 2005/0265297 | A1 | 12/2005 | Nakajima |
| 2006/0059256 | A1 | 3/2006 | Kakani |
| 2007/0047486 | A1 | 3/2007 | Lee |
| 2007/0091810 | A1 | 4/2007 | Kim |
| 2007/0116094 | A1 | 5/2007 | Parts |
| 2008/0080516 | A1 | 4/2008 | Sammour |
| 2008/0123573 | A1 | 5/2008 | Jiang |
| 2009/0103498 | A1 | 4/2009 | Nilsson |
| 2009/0235137 | A1 | 9/2009 | Umesh |
| 2012/0026945 | A1 | 2/2012 | Meyer |

FOREIGN PATENT DOCUMENTS

| | | |
|---|---|---|
| EP | 2108223 B1 | 9/2015 |
| WO | 9633586 W | 10/1996 |
| WO | 2006058502 A1 | 6/2006 |
| WO | 2007077526 A2 | 7/2007 |
| WO | 2007091810 A1 | 8/2007 |
| WO | 2008024282 W | 2/2008 |

OTHER PUBLICATIONS

Ericsson: RLC status report format—Tdoc R2-074701 TSG-RAN WG2 Meeting #60 Jeju Island, Korea, Nov. 5-9, 2007.
Huawei: RLC status PDU type and format—R2-073174 3GPP TSG-RAN WG2 meeting #Aug. 20-24, 59, 2007 Athens, Greece.
Huawei: RLC status PDU type and format—R2-073970 3GPP TSG-RAN WG2 meeting #59bis Oct. 8-12, 2007 Shanghai, China.
Motorola: RLC Status Report SUFI for PDU segments—R2-074397 3GPP TSG-RAN WG2 Shanghai, China Oct. 8-12, 2007.
Motorola: RLC Status Report SUFIs for PDU/PDU segments ACK/NACK—R2-073539 3GPP TSG-RAN WG2 Athens, Greece Aug. 20-24, 2007.
Panasonic: RLC PDU format for LTE—R2-070095 3GPP TSG RAN WG2#56bis Jan. 15-19, 2007 Sorrento, Italy.
Texas Instruments Inc. : RLC Control Packet Structure—R2-074023 3GPP TSG-RAN WG2 Meeting #59 bis Shanghai, China, Oct. 8-12, 2007.

* cited by examiner

300

| D/C | PDU type | | ACK_SN | |
|---|---|---|---|---|
| | | E | NACK1_SN | |
| | | | E | F |
| | | NACK2_SN | | |
| | E | F | NACK3_SN | |
| | | | E | F |
| | | SO11 | | |
| | | SO12 | | |
| | | SO21 | | |
| | | SO22 | | |
| | | ............ | | |
| | | ............ | | |
| | | PAD | | |

Fig 3

| F  | Meaning                      | No. of SOs |
|----|------------------------------|------------|
| 00 | NACK, RLC PDU                | 0          |
| 01 | NACK, first part of RLC PDU. | 1          |
| 10 | NACK, last part of RLC PDU.  | 1          |
| 11 | NACK, middle part of RLC PDU.| 2          |

Fig 4

| SN | RF | E |
|----|----|----|
| 1 | 1 | 1 |
| 2 | 1 | 1 |
| 3 | 1 | 1 |
| 3 | 1 | 0 |
| 1 | 16 | |
| 24 | 36 | |
| 1 | 23 | |
| 47 | 42 | |
| SO | LF | |

Fig 6

METHOD AND A DEVICE FOR IMPROVED STATUS REPORTS

CROSS REFERENCE TO RELATED APPLICATIONS

This patent application is a continuation of U.S. patent application Ser. No. 16/952,276 filed on Nov. 19, 2020 which is a Ser. No. 15/650,062 filed on Jul. 14, 2017 which is a continuation of U.S. patent application Ser. No. 14/614,159 filed on Feb. 4, 2015 which is a continuation of U.S. patent application Ser. No. 13/269,338 filed on Oct. 7, 2011 which is a continuation of U.S. patent application Ser. No. 12/524,891 filed on Jul. 29, 2009, which is the U.S. national stage entry of PCT/SE2008/050108, filed Jan. 28, 2008, which claims the benefit of U.S. Provisional Application No. 60/983,633, filed Oct. 30, 2007 and PCT/EP2007/050994 filed on Feb. 1, 2007, the disclosures of which are all fully incorporated herein by reference.

TECHNICAL FIELD

The present invention discloses a method for use in a cellular communications system, in which system traffic can be exchanged between a first and a second transceiver. The traffic is sent in data units, each of which is given an identifier and which may be divided into segments. A receiving transceiver may send status information in data frames or data units about transmitted data units to a transmitting transceiver, i.e. to the transceiver from which the data was transmitted.

BACKGROUND

In the 3GPP LTE project (3rd generation Partnership Project, Long Term Evolution) for cellular communication systems, an RLC (Radio Link Control) protocol is used for communication between users in a cell and the controlling node of the cell, i.e. the so called eNodeB, "evolved NodeB".

In the RLC, traffic is sent as so called PDUs, i.e. Protocol Data Units, which are identified by being given sequence numbers. In response to PDUs from a transmitting party, the receiving party sends so called RLC status PDUs to the transmitting party, with so called ACKs and/or NACKS, i.e. acknowledgements (ACK) that data has been properly received, or information (NACK) that data has not been properly received, i.e. received only partly or not at all. The ACKs and NACKS in the RLC status PDUs are sent as PDU sequence numbers, in order to identify the PDU in question.

In LTE systems, RLC PDUs may be segmented, which has as a consequence that there will be two or more PDU segments with the same sequence number, since the sequence number is a property of the PDU. The process of segmenting PDUs is also denoted as re-segmentation.

Because of the re-segmentation in LTE, the sequence numbers will not suffice to identify the data for which ACK or NACK is sent.

SUMMARY

As has emerged from the explanation above, there is a need for a solution by means of which ACKs and NACKs which are transmitted by a receiving party to a sending party in 3G LTE systems can be identified, with respect to the data segments that they are sent in response to.

In addition, another need which should be addressed by the solution in question is that it should be possible to send a variable number of NACKs.

This need is addressed by the present invention in that it discloses a method for use in a cellular communications system, in which system traffic can be exchanged between a first and a second transceiver. The traffic in the system is sent in data units, each of which is given an identifier. The data units may be divided into segments, and a receiving transceiver may send status information in data frames or data units about properly received, partially received, or non-received data units to a sending transceiver, i.e. to the transceiver from which the data was sent.

According to the method of the invention, in the case of one or more partially or non-received data units, the status information which is sent to the sending transceiver includes information about whether the data units were non-received or partially received, and in the case of a partially received data unit, which parts of the data units that were not received.

Thus, by means of the invention, it becomes possible for the receiving transceiver to distinctly identify non-received parts of data units to the sending transceiver, thus in turn enabling the sending transceiver to retransmit those parts.

Also, the invention makes it possible to identify more or less any amount of non-received data, which was another of the needs to be addressed by the invention.

In one embodiment of the invention, the information about whether or not a data unit was non-received or partially received is included as a flag in said data frames or data units.

In another embodiment, the information about which parts of a data unit that were non-received is included in the data frames or data units as information which indicates a first and a last part of the non-received data.

In yet another aspect of the present invention, in the case that a data frame or unit from the sending transceiver has been segmented and one or more last segments has not reached the receiving transceiver, this can be indicated by the receiving transceiver.

In a further embodiment of the invention, the information about which parts of a data unit that were non-received is included in the data frames or data units as information which indicates the identifier of the data unit, as well as information about the beginning of the non-received data in said data unit, and the amount of non-received data.

These and other aspects and advantages of the present invention will be explained in more detail in the detailed explanation given below.

The invention also discloses a transceiver for use in a system of the invention.

BRIEF DESCRIPTION OF THE DRAWINGS

The invention will be described in more detail in the following, with reference to the appended drawings, in which FIGS. 2-6 show various embodiments of the invention.

DETAILED DESCRIPTION

Figure 1:
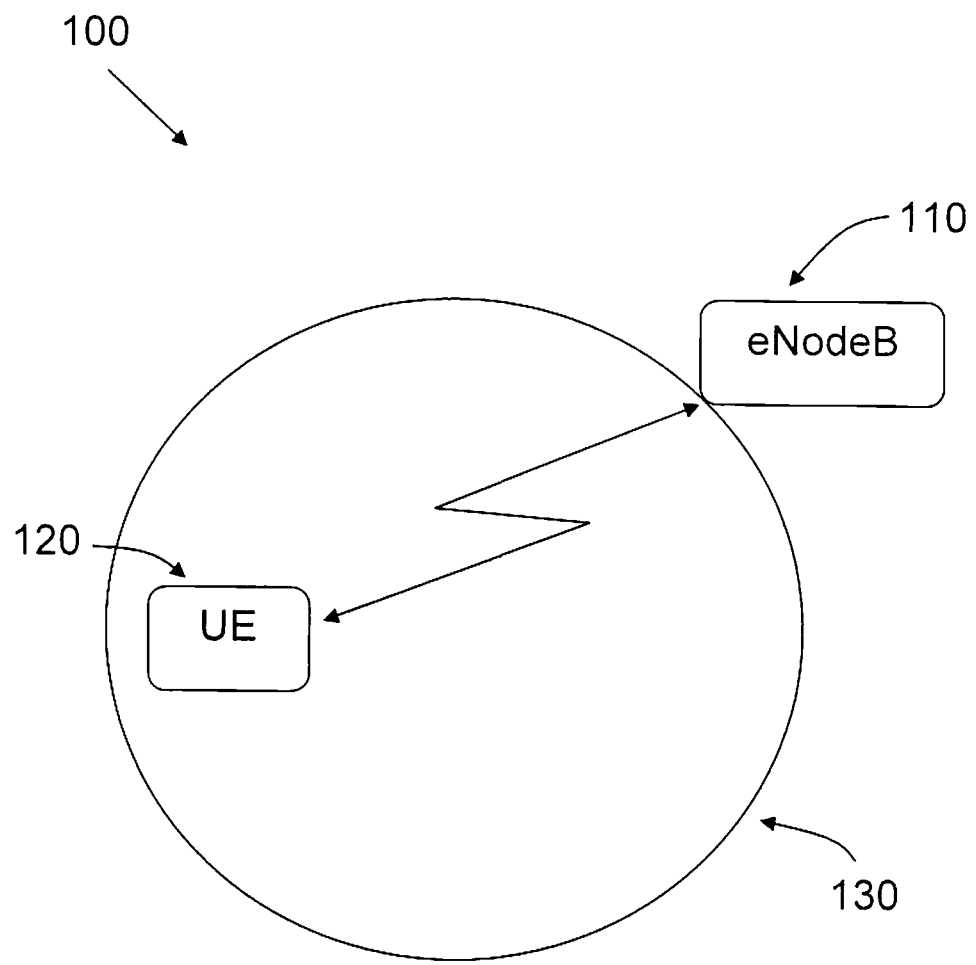
FIG. 1 shows a schematic view of a system in which the invention may be applied.

FIG. 1 shows a schematic view of a system 100 in which the invention may be applied. As mentioned previously, the invention is mainly intended for systems of the 3GPP LTE kind, i.e. Third Generation Partnership Project, Long Term Evolution systems, sometimes also referred to merely as LTE systems, but officially in 3GPP known as evolved UTRAN or E-UTRAN. These names will be used interchangeably throughout this description.

As shown in FIG. 1, an LTE system 100 can comprise a number of so called cells, one of which is shown as 130 in FIG. 1. Each cell in an LTE system can accommodate a number of users, sometimes generically referred to as UEs, User Equipments. In FIG. 1, one UE is symbolically shown, with the reference number 120.

LTE systems such as the one 100 in FIG. 1 will also comprise a so called "eNodeB", evolved NodeB, for each cell. One of the functions of the eNodeB of a cell is to control the traffic to and from users in a cell. In FIG. 1, an eNodeB 110 is shown as the eNodeB for the cell 130.

Traffic from the eNodeB to an UE is referred to as down link traffic, or simply DL traffic, and traffic from the UEs to the eNodeB is known as up link traffic, or simply UL traffic.

In LTE systems, an RLC protocol, Radio Link Control, is used for communication between the eNodeB and the UEs in a cell.

According to RLC, in LTE systems, traffic between two transceivers, i.e. an UE and its eNodeB is sent in so called PDUs, Protocol Data Units. According to RLC, each PDU is assigned an identifier, a so called sequence number, which allows both the sending and the receiving party to identify a PDU.

In the description below, it will be assumed that data PDUs are sent by the eNodeB, i.e. in DL, and that status PDUs are sent by an UE, i.e. in UL. However, it should be pointed out that this is merely an example intended to facilitate the reader's understanding of the invention, the invention can equally well be applied in the other direction, i.e. Data PDUs in UL and Status PDUs in DL. It can be mentioned here that E-UTRAN RLC can operate in different modes, configured by the eNodeB, namely Acknowledged Mode (AM), Unacknowledged Mode (UM) and transparent mode (TM). The status PDUs are at present only used in AM.

If the eNodeB 110 sends a PDU which contains data to the UE 120, i.e. a so called data PDU, the UE can reply with a so called status PDU, i.e. a PDU which indicates to the eNodeB the reception status of the data in the data PDU which was sent from the eNodeB.

In the status PDU to the eNodeB, data units which are correctly received by the UE is acknowledged by the UE by means of so called ACK messages or indicators, and data units which are erroneously received, i.e. only received in part, or not received at all are indicated by the UE by means of a so called negative ACK, a NACK. If the eNodeB from which the data originated receives a NACK in return for transmitted data, the eNodeB will thus know that this information should be retransmitted, usually until an ACK is received. In the case of DL data traffic, a UE will thus send status PDUs with ACKs and/or NACKs to the eNodeB in response to data PDUs from the eNodeB.

The ACKs provide information about up to which sequence number PDUs have been correctly received. This can be done either by providing the highest number of a successfully received PDU, or the first number of a non-received PDU.

In E-UTRAN RLC, data PDUs can be re-segmented, i.e. the payload of a previously created RLC PDU can, at the time of retransmission, be split into segments that are sent separately.

In LTE, it is intended that RLC PDU segments should be identified by means of the sequence number of the original RLC PDU, as well as a so called segmentation offset, SO, which indicates the segments' start in the original RLC PDU. An ACK or a NACK is sent in the form of the sequence number of the original RLC PDU, but since re-segmentation can occur, the segments which the ACK or NACK from the UE refers to cannot be identified uniquely in the eNodeB by means of the sequence number, and not even by means of the SO, due to the fact the segmentation can occur in several "generations", i.e. multiple re-segmentations can occur, and the eNodeB does not know which generation that the ACK/NACKs refer to.

It is this problem, i.e. identification of ACK/NACK:ed RLC PDU data that the invention intends to address.

Different cases can be discerned when it comes to status PDUs:
 a. A status PDU with only one ACK, and no NACKs.
 b. A status PDU with one ACK and one or more NACKS, which has two sub-cases:
  i. One or more of the NACKs are "segment NACKs".
  ii. All of the NACKS are non-segment NACKs.

Figure 2:
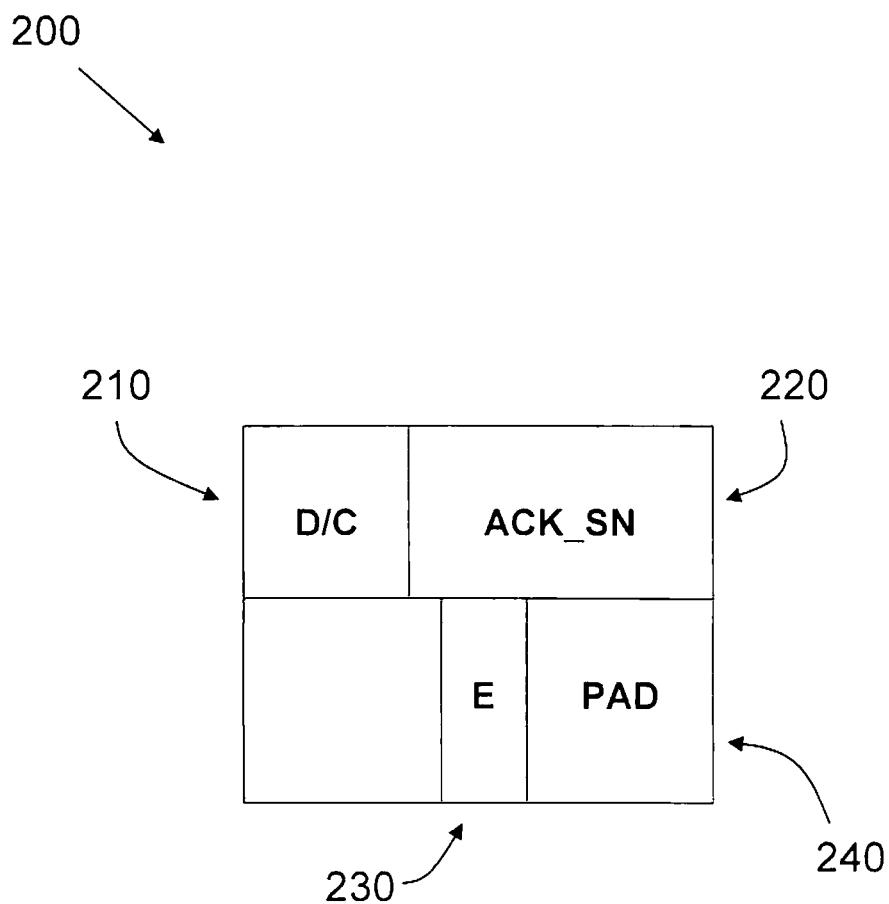

In order to address case "a" above, the invention proposes a status PDU which is shown in FIG. 2 with the reference number 200. As shown in FIG. 2, the status PDU 200 comprises a D/C-field 210, which indicates if the PDU 200 is a data or a control PDU. As will be understood, a status PDU is a control PDU.

In addition, the status PDU 200 includes an ACK field 220, with the ACK being provided in the form of the sequence number, SN, of the RLC PDU which the ACK refers to. The status PDU 200 also comprises an indicator, e.g. a flag or bit, shown in FIG. 2 as an "E-bit" 230, which is used to indicate the presence or absence of NACKs in the status PDU 200.

In the case of absence of NACKs in the status PDU, i.e. the case shown in FIG. 2, so called "padding" or "dummy bits" can be used in order to achieve proper alignment of the contents of the status PDU 200. One example of such alignment is so called "octet alignment", i.e. alignment which is used if the status PDU is divided into data octets. The padding is shown as 240 in FIG. 2.

Turning now to the case identified as "b-i" above, i.e. where one or more of the NACKs refer to segmented data units, in other words the case in which the NACKs indicate that a data unit has been partially received, a concept used by the invention will now be introduced. This concept is here referred to as "Segment Offset pairs" or "SO pairs", i.e. a data pair, one of which is used to indicate the first non-received data octet of the PDU which the NACK refers to, and the other of which is used to indicate the last non-received data octet which the NACK refers to. It can be added here that although octets are used to exemplify the invention since octets are used in LTE RLC, the invention can naturally be used if data is sent in other sizes as well.

An example of a Status PDU format 300 which can handle case "b-i" above is shown in FIG. 3. In similarity to the Status PDU format 200 of FIG. 2, the Status PDU format 300 comprises a field which indicates if the PDU 300 is a data or a control PDU, and an ACK field with the ACK being provided in the form of the sequence number, SN, of the RLC PDU which the ACK refers to. The status PDU 300 also comprises an indicator, e.g. a flag or bit, shown in FIG. 3 as an "E-bit", which is used to indicate the presence or absence of NACKs in the status PDU 300.

If one or more NACKs is included, as in FIG. 3, each NACK is followed by an "E" bit or flag and an "F" bit or flag, where the E bit/flag indicates if another NACK is present or not, and the F bit/flag indicates if an SO pair is included for the particular NACK or not. In other words, the F bit/flag can be said to indicate if the data unit to which the NACK refers was segmented or not, since that is the only case when SO pairs are used.

It can also be mentioned that the case of (for example) two missing but non-consecutive parts of one and the same PDU can be handled by the present invention in that one and the same NACK SN will occur twice, but with different SO pairs.

In similarity to the embodiment of FIG. 2, the ACKs and NACKs of the status PDU 300 of FIG. 3 are provided in the form of the sequence number, SN, of the RLC PDU which the ACK or NACK refers to, for which reason the ACK/NACKs are shown as ACK_SN or NACK_SN.

After the last NACK of the status PDU 300 in FIG. 3, the SO pairs are included for the NACKs for which the "F" flags/bits were set. Thus, the SO pair shown as SO11 and SO12 "belong" to NACK1_SN, and the SO pair shown as SO21 and SO22 "belong" to NACK2_SN. Also, as shown in FIG. 3, "padding", PAD, may be used in the status PDU 300 of FIG. 3, in order to obtain octet alignment or some similar purpose.

Returning now to the information comprised in the SO pairs, the first SO in an SO pair indicates the first missing data octet of the PDU, and the last SO in a pair indicates the last missing data octet in the PDU It should be pointed out that if the data in the received PDUs, i.e. the PDUs to which the ACK/NACKs refer, is arranged in groups other than octets, the invention can of course also be applied to such systems. The SO pairs would then in a way similar to that described above indicate the beginning and the end of the data in the PDU to which the NACK refers.

It can also be added that the status PDUs of the invention can also be expanded by means of a field, for example after the D/C-field, which indicates the nature of the status PDU, for example if RLC control PDUs other than STATUS PDUs are used. This field is included in the example shown in FIG. 3, indicated as "PDU type". The same principle, i.e. PDU type, may be applied in the version shown in FIG. 2.

With continued reference to the status PDUs of the invention, it should also be pointed out that the order of the data fields in the status PDUs shown in FIGS. 2 and 3 are merely examples of suitable embodiments, the data fields in the status PDU of the invention can be moved to other positions in the status PDU without affecting the functionality of the invention, for example in order to achieve octet alignment. As an example, in the case with only an ACK and no NACKs, i.e. the embodiment shown in FIG. 2, the status PDU 200 could start with a D/C field followed by an E bit, followed by padding and lastly the ACK with its sequence number.

Turning now to the case shown as b-ii above, i.e. one or more NACKs refer to non-received data PDUs, as opposed to partially received data units, this is handled in the following manner: the F flag corresponding to those NACKs indicates that no SO pairs are included in the status PDU for those NACKs.

A special case which is also addressed by the invention is when the last PDU segment of an RLC PDU has not been received by the UE (still assuming the case of data PDUS in DL). Assume an example where an RLC PDU with sequence number 10 has been segmented into 3 RLC PDUs, with the PDU segments containing octets 1-10, 11-25 and 26-40, respectively.

Consider now the case in which the UE has received the first two segments of RLC PDU 10, i.e. octets 1-10 and 11-25, and has also received the following RLC PDU, i.e. RLC PDU 11, in its entirety, but the UE has not received the last segment of RLC PDU 10, i.e. octets 26-40.

In this case, the UE knows that an RLC segment has been lost, but does not know its length, so the UE cannot set the second segmentation offset value in the corresponding SO pair in the status PDU. A solution to this which is proposed by the invention is to let a special value of an SO indicate that the end of the NACK:ed segment is not known. Thus, when the eNodeB receives a NACK for RLC PDU 10, a first SO is set to 26 and the corresponding second SO is set to the special value which tells the eNodeB that all data octets from 26 and forward for RLC PDU 10 need to be retransmitted.

In some cases, an SO pair is not always necessary to obtain the desired effect. As will be shown in the following, by using two bits in the "F" field, a complete identification of the non-received data may be achieved.

This is shown in the example of FIG. 4, in which all four combinations of two bits in the F field are illustrated, i.e. 00, 01, 10 and 11. The meanings of each of these combinations are also indicated in FIG. 4, as follows:

| F field | Meaning |
|---------|---------|
| 00 | The NACK refers to the entire RLC PDU, so no SOs are necessary. |
| 01 | The NACK refers to a first part of the RLC PDU, 1 SO is needed in order to indicate the last non-received data group, such as, for example, an octet. |
| 10 | The NACK refers to a last part of the RLC PDU, 1 SO is needed in order to indicate the first non-received data group, such as, for example, an octet. |
| 11 | The NACK refers to a middle part of the RLC PDU, 2 SOs are needed in order to indicate the first and the last non-received data group, such as, for example, an octet. |

It should be pointed out that in the case shown in FIG. 4, in similarity to the embodiments shown previously, a "type field" may be needed in order to separate status RLC PDUs from other RLC control PDUs.

Figure 5:
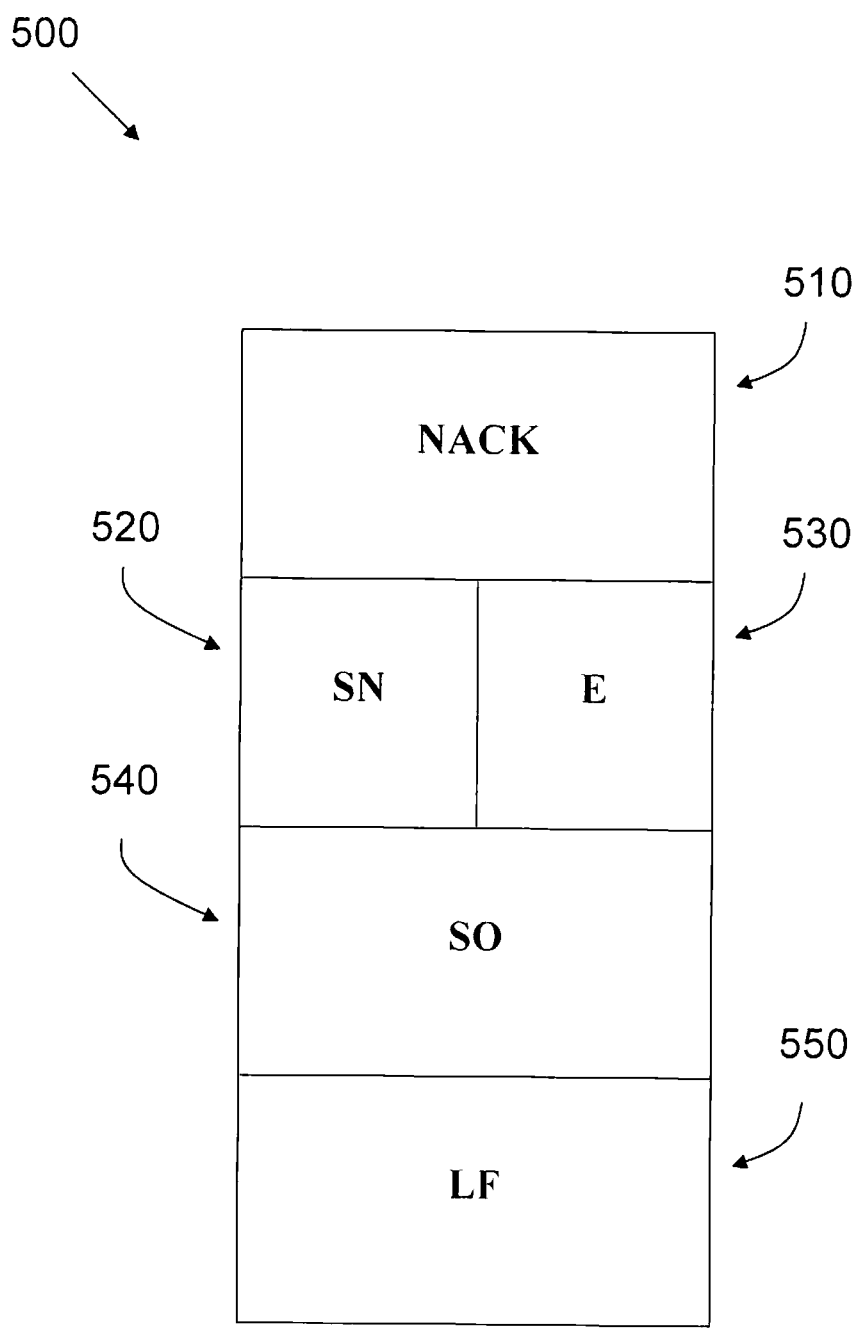

In another embodiment of the present invention, partially received DL RLC data PDUs are indicated to the eNodeB by the UE in an UL status RLC PDU in a slightly different manner than that shown above, i.e. the SO pairs. In the embodiment in question, the status RLC PDU 500 of which is shown in FIG. 5, the UL status RLC PDU from the UE comprises a NACK field, shown as 510, and a sequence number field, SN, shown as 520, which indicates the sequence number of the DL RLC data PDU which the NACK refers to. Naturally, in the embodiment 500, the SN can also be included together with the NACK, as shown in previous embodiments.

In similarity to the previous embodiments, the embodiment 500 also includes the use of an "E" field, shown as 530 in FIG. 5. However, the significance of the E-field, i.e. a bit or a flag, differs slightly from that of the previous embodiments: in the embodiment 500 of FIG. 5, the E-field is used to signify if the NACK 510 refers to an entire RLC data PDU or to data within an RLC data PDU. For example, if the E-field equals zero, E=0, this could signify that the NACK 510 refers to the entire RLC data PDU which is identified by the SN 520.

Conversely, if E=0 signifies an entire PDU, then E=1 signifies that the NACK 510 refers to data within the PDU identified by the SN 520. In this case, information is included in the status PDU 500 in order for the eNodeB to be able to identify the data in question. This information regarding data in the embodiment 500 comprises a segment offset value, SO, shown as 540 in FIG. 5. The SO 540 indicates the byte offset or the start of the non-received DL data. However, as opposed to the previous embodiments, the embodiment 500 does not use SO pairs to indicate the totality of the non-received data. Instead, the embodiment 500 utilizes a Length Field, LF, 550, the value of which indicates the beginning of the non-received data, starting from the SO value 540, up to the last byte of the non-received data.

As can be realized, in this embodiment of the invention, i.e. the one shown in FIG. 5, in order to achieve efficient retransmission from the original sender of the data, the exact number of bytes that should be retransmitted needs to be indicated to the sender. Since LTE RLC PDUs can be quite large (e.g. 32767 bytes), the fields (i.e. SO and LF) needed for indication of the RLC PDU segments would need to be quite large as well. However, as will also be realized, in many cases the maximum theoretical size of the SO and LF fields will not need to be utilized, which would thus lead to a waste of data space if the size of those fields were made static.

In one embodiment of the present invention, the inventors propose to alleviate this problem, i.e. inefficient use of data space for the SO and LF fields. This embodiment will be described in the following.

In this aspect of the invention, a basic principle is that the SO and LF field sizes in the RLC status PDU are made adaptive to the needs of the current RLC status PDU. Obviously, it is possible to use two different sizes for SO and LF, e.g. 6 bits for RSO and 4 bits for RSL. However, in the subsequent description, it will be assumed that the size is the same.

If, as proposed in this aspect of the present invention, a dynamic length field for SO and LF are used, the eNodeB (in the case of data in DL and status messages in UL) must know this length field size in order to be able to read the status message.

A first way of accomplishing this is to have an additional field in the RLC status PDU message header which is indicative of the size of the SO and LF fields. For example, there could be a field which indicates that all length fields in the current message are 6 bits. This size could differ from RLC PDU status message to status message.

If SO and LF were to be given different size values, two such length fields would be needed, or use could be made of a predefined relationship between them, e.g. SO is always x bits longer/shorter than LF. However, since SO and LF are typically of the same order, this optimization might not be required.

According to an alternative aspect of the invention, the explicit indication of the size of the SO and LF fields is superfluous, due to a re-arrangement in the RLC PDU status message. In this aspect of the invention, it is proposed to move the "length fields" SO and LF to the end of the RLC PDU status message, which will be described with reference to FIG. 6.

Figure 6:
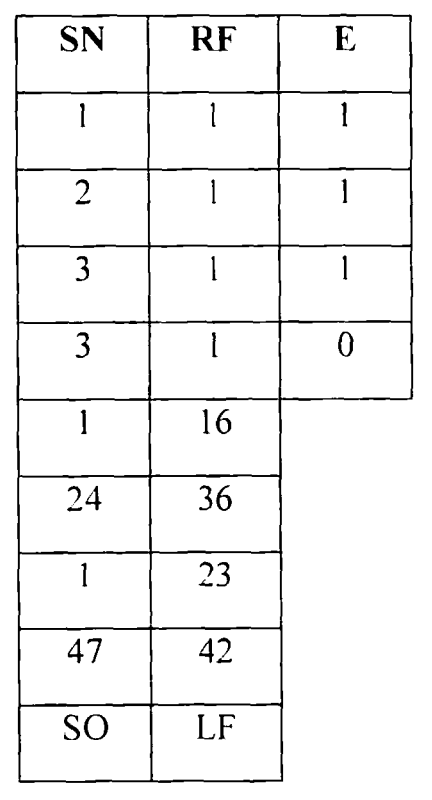

In the embodiment shown in FIG. 6, the status information for all included PDUs is provided first, i.e. SN (segment number), RF (Resegmentation Flag) and an extension bit, "E". In this way it will be possible to also include complete PDUs, where no specific segment information needs to be sent. For PDUs where resegmentation has occurred, the RF is used to indicate that segment location and length information follows, and SO and LF are appended to the message frame Thus, in the embodiment of FIG. 6, the "dynamic" part of the status message, i.e. SO and LF, occurs after the last extension bit E, i.e. after the first E bit with a value which indicates that it is the last one, such as for example the value "0". Since the overall message size in this embodiment needs to be known, for example from a MAC or RLC header, the receiver knows how many bits are left for the SO and LF fields. It also knows how many SO and LF pairs that will follow after the last extension bit. Thus, the receiver can calculate the sizes of the SO and LF fields.

If it is a requirement that the RLC status PDU should be byte-aligned, an additional step has to be carried out, in that the number of remaining bits is also divided by the number of indicated segment fields. The integer result is used as length, while the remaining bits are not used. As an example, if the remaining length is 51 bits, and byte alignment (8 bits) is used, we get the calculation 51/8=6 mod 3. Thus, in this example, 3 bits at the end of the status PDU will not be used.

In the example above, the LF is used to determine the end of an RLC PDU segment. However, it is would be possible within the scope of the present invention to use an absolute offset, in similarity to the SO. In such a case, the offset would point to the original position of the last byte in the RLC PDU segment.

The status message content might describe the data that is ACK:ed or NACK:ed. Also, a mixture of ACKs and NACKs could be included, with one or more additional bit(s) to provide a suitable ACK/NACK indicator.

The described status message of FIG. 6 should merely be seen as an example, additional fields like type flags to indicate whether the PDU contains data or a status, additional length fields and so on might be required in some applications, and would be within the scope of this invention.

Explicit status information may also be added to the status reports, especially in case the standard or implementation allows multiple types of states to be reported, e.g. NACK and ACK.

An explicit indication of a status may also be necessary if the LTE system is configured to exchange a status report of a single type, e.g. only NACKs. Alternatively, the status report sending entity may receive from the PDU sending entity a request for a status report of a certain type (e.g. NACK only) and would thus generate the status report only for the subset of received segments that have been not been received.

In a further aspect of the invention, it could be envisioned to send the RLC PDU status message as a separate PDU, or piggybacked with another PDU.

Figure 7:
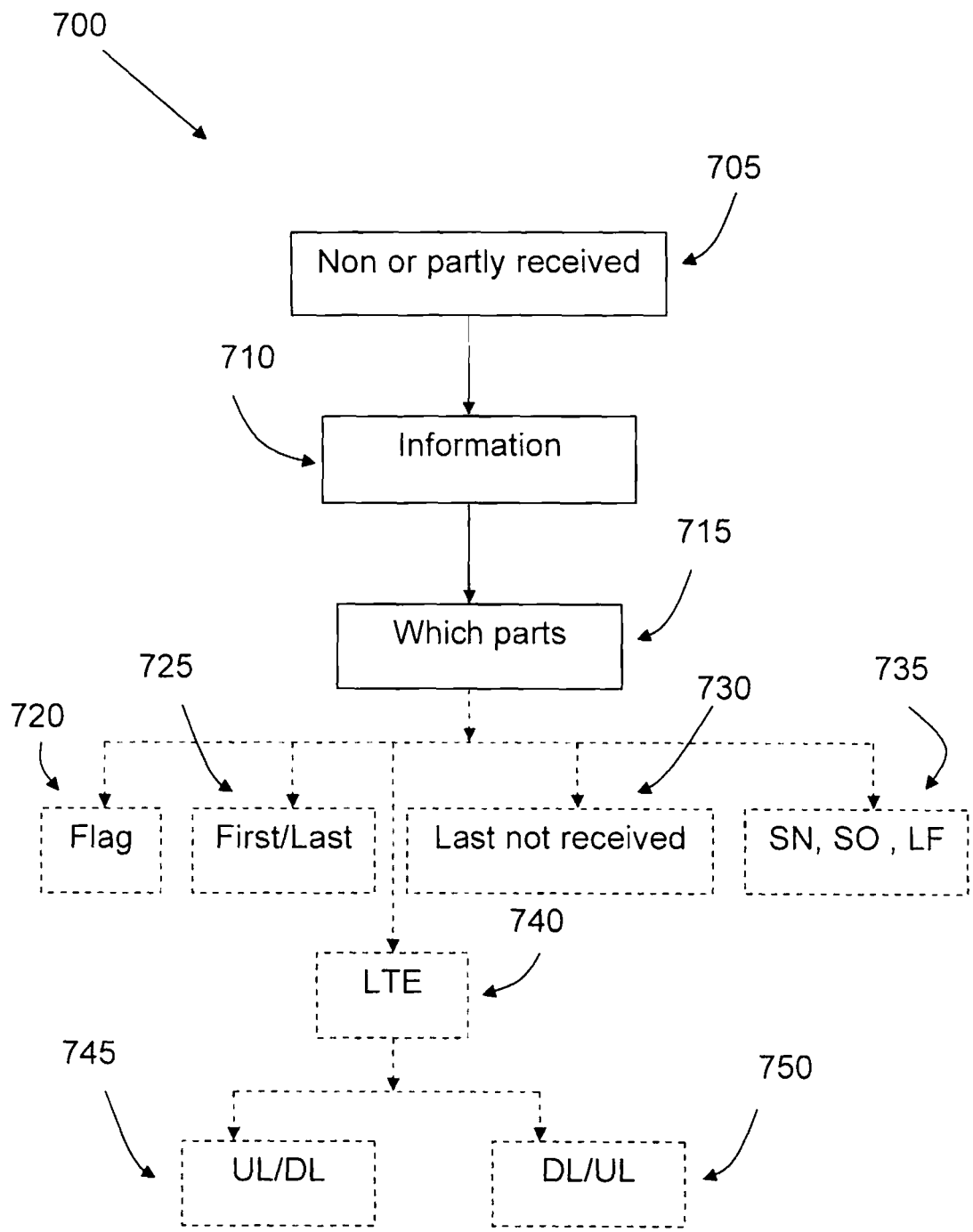
FIG. 7 shows a schematic flow chart of a method of the invention.

FIG. 7 shows a rough flow chart of a method 700 of the invention. Steps which are options or alternatives are shown with dashed lines.

As has been indicated in the description above, the method of the invention is intended for use in a cellular communications system such as the one 100 of FIG. 1, i.e. a system in which traffic can be exchanged between a first and a second transceiver such as the UE 120 and the eNodeB 120.

The traffic in the system 100 is sent in data units, and each of these data units is given an identifier. The data units may be divided into segments, and a receiving transceiver may send status information in data frames or data units about properly received, partially received or non-received data units to the sending transceiver, i.e. to the transceiver from which the data was sent.

According to the inventive method 700, as indicated in step 705, in the case of one or more partially or non-received data unit or units, the status information which is sent to the sending transceiver includes, as shown in step 710, information about whether data unit or units were non-received or partially received, and if so, as shown in step 715, in the case of one or more partially received data units, which parts of those data units that were not received.

In one embodiment of the invention, as shown in step 720, the information the information about whether or not a data unit was partially or non-received is included as a flag in said data frames or data units.

As indicated in step 725, in a further embodiment of the invention, the information about which parts of a data unit that were not received is included in said data frames or data units as information which indicates a first and a last part of the not received data unit.

Step 730 indicates that in one aspect of the invention, if a data frame or unit from the sending transceiver has been segmented or re-segmented, and a last segment has not reached the receiving transceiver, this can be indicated by the receiving transceiver to the sending transceiver, suitably by means of a special predefined value for the information about the last part of the non-received received segments.

Step 735 indicates that in one embodiment of the invention, if a data frame or unit from the sending transceiver has been segmented and a last segment has not reached the receiving transceiver, this can be indicated by the receiving transceiver to the sending transceiver As has been indicated previously in this description, and as shown in step 740, the method 700 of the invention may suitably be applied to an LTE, Long Term Evolution, system such as the one 100 which is schematically shown in FIG. 1.

If the inventive method 700 is applied to an LTE system, the data PDUs may be sent in DL and the corresponding status PDUs will then be sent in UL, as indicated in step 750, in which case the "sending transceiver" mentioned above is the eNodeB of an LTE cell, and the "receiving transceiver" is a UE User Equipment, of the LTE cell.

Conversely, the invention may equally well be applied so that the data PDUs may be sent in UL and the corresponding status PDUs will then be sent in DL, as indicated in step 745, in which case the "sending transceiver" mentioned above is the UE of an LTE cell, and the receiving transceiver is the eNodeB of the LTE cell.

With reference to the status PDU 300 shown in FIG. 3, it can be pointed out that the information from the receiving transceiver to the sending transceiver can be sent as a message which has the possibility of comprising one or more of the following:
Information (D/C) about the nature of the message, e.g. data or control message,
Information (PDU type) about the type of message within said nature, e.g. a status message in the case of control message,
Data (ACK) acknowledging properly received data units or frames in the form of a certain sequence number,
A first extension indicator (E),
Data (NACK) regarding an non- or partially received data unit or frame in the form of a certain sequence number (SN) of said data unit or frame,
A second extension indicator (F),
Information about the beginning (SO11, SO21) and end (SO12, SO22) of non-received data.

In the exemplary status PDU shown in FIG. 3, the first extension indicator, E, indicates the absence or presence of a set comprising another of the first, and second extension indicators, i.e. E and F, and data, NACK, regarding a partially or non-received data unit or frame, in the form of the identifier, SN, of the data unit or frame. The second extension indicator, F, indicates the absence or presence of information about the beginning, SO11, SO21, and end, SO21, SO22, of non-received data.

The invention also discloses a transceiver for use in a system in which the invention is applied. As has emerged from the description above, the invention can be applied either when data PDUs are sent in DL and the corresponding status PDUs are sent in UL, in which case the data sending transceiver (in the case of E-UTRAN applications) is the eNodeB and the receiving transceiver, i.e. the transceiver which transmits status PDUs is the UE, or conversely, when data PDUs are sent in UL and the corresponding status PDUs are sent in DL, in which case the data sending transceiver is the UE and the receiving transceiver, i.e. the transceiver which transmits status PDUs is the eNodeB. Thus, the transceiver of the invention may be either an E-UTRAN eNodeB or an E-UTRAN UE.

Figure 8:
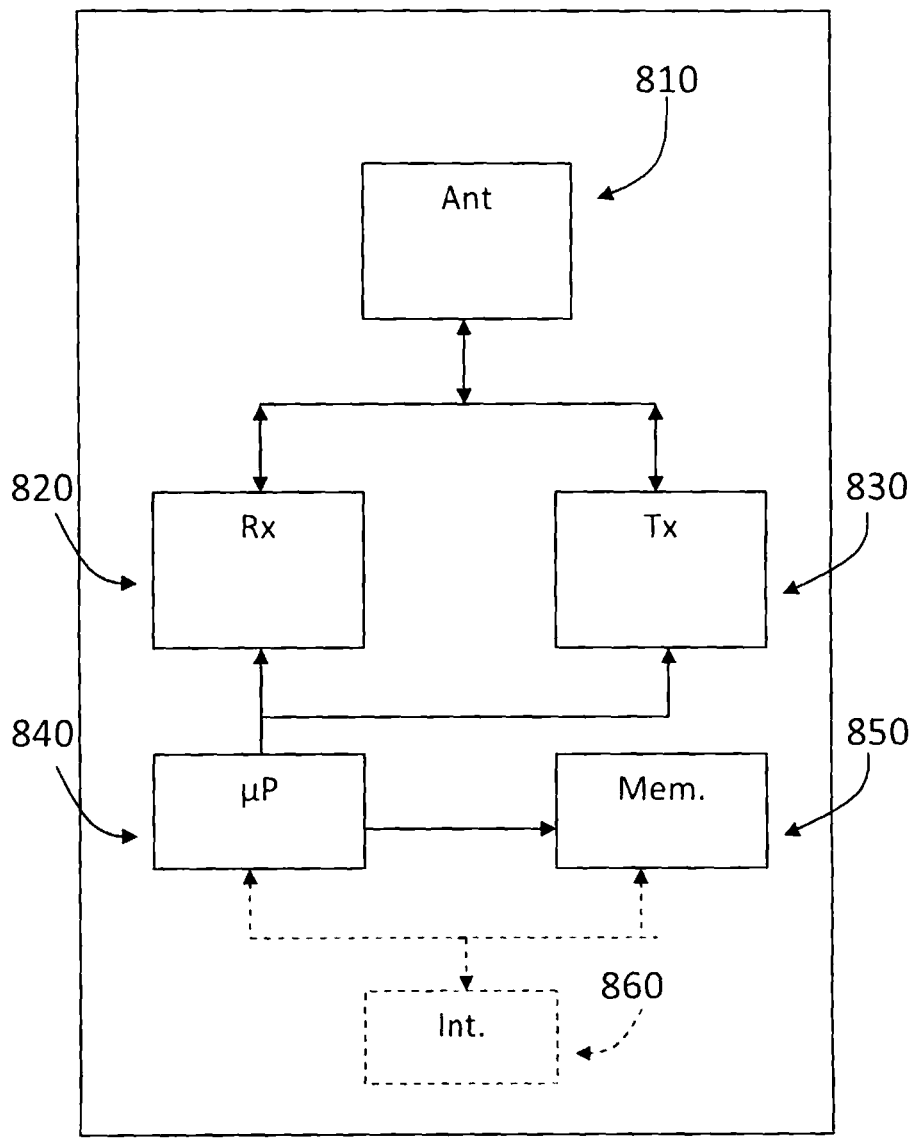
FIG. 8 shows a block diagram of a transceiver of the invention.

A schematic block diagram of a generic inventive transceiver 800 for use as an E-UTRAN eNodeB or an E-UTRAN UE is shown in FIG. 8. As indicated in FIG. 8, the transceiver 800 will comprise an antenna, shown as block 810, and will also comprise a receive part 820 and a transmit part 830. In addition, the transceiver 800 also comprises a control means 840 such as a micro processor, as well as a memory 850. Furthermore, if the transceiver 800 is to be used as an eNodeB, the transceiver 800 also comprises an interface 860 towards other components in the system apart from the UEs. Since the interface may not be present if the transceiver 800 is a UE, the interface 860 is shown with dashed lines.

The transceiver 800 can use the antenna 810, the receive part 820 and the transmit part 830 for sending traffic to and receiving traffic from a second transceiver in the system, and the transceiver 800 may use the control means 840 together with the memory 850 for sending said traffic in data units.

The control means 840 and the memory 850 may also be used for giving each of the data units an identifier, such as for example a sequence number, and the same means, i.e. blocks 840 and 850 may be used for dividing the data units into segments.

The inventive transceiver 800 also uses the control means 840, the memory 850, the transmitter 830 and the antenna 810 for sending information in data frames or data units about properly received, partially received or non-received data units to the second transceiver, i.e. to the transceiver from which the data was sent.

In addition, the transceiver 800 can use the control means 840 and the memory 850 for, in the case of one or more non-received or partially received data units, including information in the status information about whether the data unit or units were non-received or partially received, and in the case of one or more partially received data units, which parts of those data units that that were non-received.

In one embodiment, the means 840 and 850 are used by the transceiver 800 for including the information about whether or not a data unit was partially or non-received as a flag in said data frames or data units.

In addition, in a further embodiment, blocks 840 and 850 are used by the transceiver for including the information about which parts of a data unit that were non-received in said data frames or data units as information which indicates a first and a last part of the non-received data unit.

In another aspect of the invention, the control means 840, the memory 850, the transmitter 830, together with the antenna 810 can be used by the transceiver 800 for indicating to a sending transceiver if a data frame or unit from the sending transceiver has been segmented, and a last segment has not reached the transceiver 800.

The indication about a missing segment is suitably carried out by means of using a special predefined value for the information about the last part of the missing segment.

In one embodiment, the control means 840 and the memory 850 can be used by the transceiver 800 for including the information about which parts of a partially received data unit that were not received in said data frames or data units as information which indicates the identifier of the data unit, as well as information about the beginning of the non-received data in said data unit, and the amount of non-received data.

In addition, the antenna 810, the transmitter 830, the control means 840 and the memory 850 can be used by the inventive transceiver for sending status information to a sending transceiver as a message, such as the one 300 of FIG. 3, which can comprise one or more of the following:
- Information (D/C) about the nature of the message, e.g. data or control message,
- Information about the type of message within said nature, e.g. a status message in the case of a control message,
- Data (ACK) acknowledging properly received data units or frames in the form of a certain sequence number,
- A first extension indicator (E),
- Data (NACK) regarding a non-received or partially received data unit or frame, in the form of a certain sequence number,
- A second extension indicator (F),
- Information about the beginning (SO11, SO21) and end (SO12, SO22) of non-received data.

Suitably, the first extension indicator (E) indicates the absence or presence of a set comprising another of said first (E) and second (F) extension indicators and data (NACK) regarding an partially or non-received unit or frame in the form of the identifier (SN) of said data unit or frame, and said second extension indicator (F) indicates the absence or presence of information about the beginning (SO11, SO21) and end (SO12, SO22) of non-received data.

The invention is not limited to the examples of embodiments described above and shown in the drawings, but may be freely varied within the scope of the appended claims.

The invention claimed is:

1. A method in a first transceiver of a cellular communications system, the method comprising:
receiving data units from a second transceiver, each of which data unit is given an identifier in the form of a sequence number, and which data units are divided into segments,
sending status information to the second transceiver in data units about partially received or non-received data units, wherein in the case of one or more non-received or partially received data unit or units, the status information is sent as a message comprising at least:
a field, comprising a first extension indicator bit,
a field, comprising data regarding a non-received or partially received data unit in the form of a sequence number for the non-received or partially received data unit, and
in the case of one or more partially received data units, information which parts of those data units were not received,
wherein said first extension indicator bit indicates the absence or presence of a set of fields, the set of fields comprising
a field, comprising another of said first extension indicator bit,
a field, comprising a second extension indicator bit indicating an absence or presence of information indicating which parts of a partially received data unit were not received, and
a field, comprising data regarding a partially or non-received data unit in the form of a sequence number for the non-received or partially received data unit.

2. The method of claim 1, according to which the second extension indicator bit indicating whether or not a data unit was partially or non-received is included as a flag in said data units.

3. The method of claim 1, according to which the information about which parts of a partially received data unit were not received is included in said data units as information which indicates a first and a last part of the non-received data unit.

4. The method of claim 1, according to which, if a data unit from the second transceiver has been segmented and a last segment of a partially received data unit has not reached the first transceiver, this can be indicated by the first transceiver to the second transceiver.

5. The method of claim 3, according to which said information which parts have not been received comprises a predefined value to indicate the last part of the partially received data unit.

6. The method of claim 1, according to which the information about which parts of a partially received data unit were not received is included in said data units as information which indicates the sequence number of the data unit, as well as information about the beginning of the non-received data in said data unit, and the amount of non-received data.

7. The method of claim 1, according to which said data unit is an RLC PDU, so that said segments are RLC PDU segments.

8. The method of claim 1, according to which the status information is sent as a message which comprises one or more of the following:
information about the nature of the message,
information about the type of message within said nature,
a field, comprising data acknowledging properly received data units in the form of a certain sequence number,
information about the beginning and end of non-received data.

9. The method of claim 8, according to which said second extension indicator bit indicates the absence or presence of information about the beginning and end of non-received data.

10. A first transceiver of a cellular communications system, the first transceiver being configured to
send data units to and receive data units from a second transceiver, in the system, wherein each of said data units is given an identifier in the form a sequence number, and wherein said data units are divided into segments,
send status information in data units about partially received or non-received data units to said second transceiver, and in the case of one or more non-received or partially received data units,
send the status information as a message comprising at least:
a field, comprising a first extension indicator bit, a field, comprising data regarding a non-received or partially received data unit in the form of a sequence number for the non-received or partially received data unit, and in the case of one or more partially received data units, information which parts of those data units were not received, wherein said first extension indicator bit indicates the absence or presence of a set of fields, the set of fields comprising a field, comprising another of said first extension indicator bit, a field, comprising a second extension indicator bit indicating an absence or presence of information indicating which parts of a partially received data unit were not received, and a field, comprising data regarding a partially or non-received data unit in the form of a sequence number for the non-received or partially received data unit.

11. The first transceiver of claim 10, comprising an antenna, a transmitter, control means and memory.

12. A method for use in a cellular communications system, the method comprising:

sending data units from a second transceiver to a first transceiver, each of which data unit is given an identifier in the form of a sequence number, and which data units are divided into segments, receiving the data units by the first transceiver from the second transceiver, sending by the first transceiver status information to the second transceiver in data units about partially received or non-received data units, wherein in the of one or more non-received or partially received data unit or units, the status information is sent as a message comprising at least:

a field, comprising a first extension bit, a field, comprising data regarding a non-received or partially received data unit in the form of a sequence number for the non-received or partially received data unit, and in the case of one or more partially received data units, information which parts of those data units were not received, wherein said first extension indicator bit indicates the absence or presence of a set of fields, the set of fields comprising a field, comprising another of said first extension indicator bit, a field, comprising a second extension indicator bit indicating an absence or presence of information indicating which parts of a partially received data unit were not received, and a field, comprising data regarding a partially or non-received data unit in the form of a sequence number for the non-received or partially received data unit, and receiving by the second transceiver the status information from the first transceiver.

13. A cellular communication system, comprising a first transceiver and a second transceiver, wherein the first transceiver is configured to send status information to the second transceiver in data units about partially received or non-received data units, wherein in the case of one or more non-received or partially received data unit or units, the first transceiver is configured to send the status information as a message comprising at least:

a field, comprising a first extension indicator bit, a field, comprising data regarding a non-received or partially received data unit in the form of a sequence number for the non-received or partially received data unit, and in the case of one or more partially received data units, information which parts those data units were not received, wherein said first extension indicator bit indicates the absence or presence of a set of fields, the set of fields comprising a field, comprising another of said first extension indicator bit, a field, comprising a second extension indicator bit indicating an absence or presence of information indicating which parts of a partially received data unit were not received, and a field, comprising data regarding a partially or non-received data unit in the form of a sequence number for the non-received or partially received data unit, and wherein the second transceiver is configured to send the data units to the first transceiver and is configured to receive the status information from the first transceiver.

* * * * *